United States Patent

[11] 3,624,193

| [72] | Inventor | Benjamin C. Sze<br>Wilmington, Del. |
|---|---|---|
| [21] | Appl. No. | 802,239 |
| [22] | Filed | Feb. 25, 1969 |
| [45] | Patented | Nov. 30, 1971 |
| [73] | Assignee | E. I du Pont de Nemours and Company<br>Wilmington, Del. |

[54] POLYAMIDE FILAMENTMAKING PROCESS INCLUDING SOLID-STATE POLYMERIZATION
1 Claim, No Drawings

[52] U.S. Cl. ................................................. 264/101,
260/78 SC, 264/141, 264/178 R, 264/210 F,
264/236, 264/290 N
[51] Int. Cl. ........................................................ D01d 5/10
[50] Field of Search............................................ 264/210,
DIG. 62, 290, 288, 176, 178, 141, 143, 144, 101,
236, 347; 260/2.3, 78 S, 78 SC

[56] References Cited
UNITED STATES PATENTS

| 2,289,774 | 7/1942 | Graves ........................ | 264/141 |
|---|---|---|---|
| 2,571,975 | 10/1951 | Waltz ........................... | 260/78 S |
| 2,834,053 | 5/1958 | Bilanin et al. ................. | 264/141 |
| 2,859,479 | 11/1958 | Eckardt........................ | 264/141 |
| 2,976,572 | 3/1961 | Kessler........................ | 264/141 |
| 3,361,859 | 1/1968 | Cenzato ...................... | 264/176 |
| 3,420,804 | 1/1969 | Ramsey et al................ | 260/78 SC |
| 3,476,711 | 11/1969 | Muller et al. ................. | 260/78 SC |

*Primary Examiner*—Julius Frome
*Assistant Examiner*—Herbert Mintz
*Attorney*—Sol Schwartz ABSTRACT: A process for preparing melt spun fibers from a polymer derived from dodecanedioic acid and bis(4-aminocyclohexyl)methane which comprises reacting said precursors in the melt to form a polyamide of from 12,000 to 15,000 molecular weight, extruding the molten polyamide as a ribbon having at least one dimension not exceeding 0.050 inch into an essentially oxygen-free atmosphere and then submerging the molten ribbon in an aqueous quench bath for at least 1 second, withdrawing the ribbon from the bath and further polymerizing in the solid phase until a polymer of molecular weight in excess of 25,000 is attained, melt spinning the polymer into filaments and drawing the filaments at least about 2.5X draw ratio to produce a high tenacity yarn essentially free from nubs and broken filaments.

POLYAMIDE FILAMENTMAKING PROCESS INCLUDING SOLID-STATE POLYMERIZATION

This invention relates to the preparation of filaments of good strength and uniformity from polyamides of high molecular weight.

DESCRIPTION OF THE PRIOR ART

It is known to produce polyamides by reacting diamines and diacids in an autoclave at melt temperatures and to extrude the same from the autoclave as ribbons (U.S. Pat. No. 2,289,774) or rods (U.S. Pat. No. 2,975,483) which may be quenched by means of a water spray before cutting. Polymer has also been extruded directly into a water bath (U.S. Pat. No. 2,859,479).

In general, polymer of the highest available molecular weight is employed to make yarn of maximum strength. Such polymer may be produced by melt polymerization, but high melt viscosity and thermal degradation of the polymer make processing difficult. In solid-phase polymerization processes, as described in U.S. Pat. No. 3,015,651, the melt polymerization step is discontinued before the molecular weight reaches the fiber-forming range, since the former is easier to reduce to fine particles preferred for solid phase polymerization. The powder is then heated below its melting point to produce polymer of high molecular weight by polymerization in the solid phase.

Certain polymers develop spherulites or spherulite-forming nuclei when extruded from the autoclave. Spherulites are brushlike crystals which appear to originate from a common central nucleus and which exhibit a so-called Maltese-cross pattern in the polarizing microscope. These spherulites cause processing problems if the polymer is polymerized in the solid-phase to a higher molecular weight prior to spinning and drawing. Filaments extruded from spherulite-containing, solid-phase polymerized product may be practically useless due to the presence of nubs. The nubs are short (0.005 to 0.05 inch long) portions of the filament which are two to five times larger in diameter than the rest of the spun filament. Usually, the nubs will cause filament or yarn breakage on drawing at normally satisfactory tensions and temperatures. The process of the instant invention is directed to avoiding this problem.

DETAILED DESCRIPTION

It has been found that a drawable polyamide is produced by a process which comprises the steps of:

1. reacting essentially equivalent amounts of dodecanedioic acid and bis(4-aminocyclohexyl)methane in the melt to form a polyamide having a molecular weight in the range of from 12,000 to 15,000
2. extruding the molten polyamide as a ribbon having at least one dimension not exceeding 0.050 inch
   a. into an essentially oxygen-free atmosphere and then
   b. submerging the molten ribbon in an aqueous quench bath for at least 1 second to rapidly quench the ribbon from a temperature above the polymer melting point,
3. withdrawing the ribbon from the bath and cutting the ribbon to flake
4. further polymerizing in the solid phase by heating the flake under vacuum or in an inert gas at 190° to 260° C. until a polymer of molecular weight in excess of 25,000 is attained;
5. melt-spinning the polymer into filaments and drawing the filaments at least about 2.5X draw ratio to produce a high tenacity yarn essentially free from nubs and broken filaments.

The essential feature of the instant invention is to cool or quench the polymer from the melt to a temperature where spherulites no longer form. A safe lower temperature in this respect is about 160° C., but rapidly quenching to 140° C. provides a greater margin of safety.

The term "ribbon" is intended to include flat structures as well as those having other cross-sectional configuration such as rods, etc. It is usually convenient to extrude the ribbon from a relatively narrow slot or orifice (or group of orifices), and into a water bath from which the ribbon is removed by a puller roll. Adjustment of puller roll speed controls the rate at which the extrudate is removed from the water bath and consequently from the extrusion orifice. As is well known, an increase in the rate at which the polymer ribbon is removed from the extrusion orifice will produce a thinner ribbon for a given extrusion rate. By a suitable adjustment of these two rates, the specified ribbon thickness is easily attained.

It is important that the ribbon be extruded into an oxygen-free atmosphere, since at melt temperatures the polymer is easily oxidized. Nitrogen or steam is normally used to provide a nonoxidizing atmosphere.

It is preferred to submerge the polymer as soon as possible into the water bath, hence the latter will normally be placed very close to the extrusion die; however, it is not practical to immerse the die in water due to the danger of polymer solidification in the die. Ordinarily submersion for at least 1, preferably 2 seconds is sufficient to reduce the temperature of the polymer below the temperature at which spherulites are formed for ribbons of about 0.050 in thickness. When thinner ribbons are extruded, shorter immersion times are satisfactory, due to rapid heat transfer. For very thin ribbons or foils, quench times of a fraction of a second may be employed. The cooling rate should exceed the rate of spherulite growth. This is readily accomplished where the ribbon in the molten state is fed into the water bath.

The polymer processed in accord with this invention is the reaction product of essentially equivalent amounts of a diamine and a diacid, at least 75 mole percent of the diacid being 1,12 dodecanedioic acid (12 acid), and at least 75 mole percent of the diamine being bis(4-aminocyclohexyl)methane (PACM) of at least 80 percent trans-trans stereoisomer content.

By "essentially equivalent amounts" is meant stoichiometric equivalence except for the presence of end group stabilizers or a slight excess of diamine or diacid to serve as a stabilizer, or to compensate for reagent lost during polymerization. It is preferred that no stabilizer be employed, since maximum molecular weight is desired. The polymerizing composition may contain minor amounts of antioxidants, light stabilizers, delusterants and the like, if desired.

Molecular weight is calculated from an analysis for amine and carboxyl ends in the polymer, making allowance for any stabilized ends which may be present, according to the method of Taylor and Waltz (Analytical Chemistry, 19, p. 448; 1942).

Relative viscosities are measured at 25° C., using a solution containing 3.7 g. of polymer in 50 ml. of a mixed solvent which is 50 percent phenol and 50 percent formic acid (98 percent), by weight.

EXAMPLE I

Equivalent amounts of dodecanedioic acid (7,616 g.) and bis(4-aminocyclohexyl)methane (90 percent trans-trans isomer) (6,964 gm.) are charged to an autoclave equipped with agitator, along with sufficient water to form a mixture (pH of 8.06) containing 40 percent (by wt.) of the salt. The composition is polymerized by heating under autogenous pressure until the temperature of 315° C. is reached (requiring about 1 hour). The autoclave pressure is then reduced to atmospheric by bleeding off steam over a period of 1¾ hrs., while raising the temperature to 325° C. The polymer is held at this temperature and at atmospheric pressure for 1 hour.

For Test A, the polymer is then extruded from the autoclave onto a casting wheel as a ribbon about three-sixteenths inch thick; the ribbon is quenched by water sprays, substantially as described in U.S. Patent No. 2,289,774. The extrusion orifice is a slot 2×⅛ inches. The ribbon is cut into ¼–½ inch flake.

Examination under a polarizing microscope at 500X shows that the ribbon is highly spherulitic. The polymer has a relative viscosity of 46 and a number average mol. wt. of about 14,000.

The thus-prepared flake is heated for 14 hours at 200° C. under an atmosphere of steam, then dried under vacuum. The flake has a relative viscosity of 300 and a mol. wt. of about 33,000.

The high molecular weight flake is extruded into filaments at a temperature of 330° C. The filaments contain over 100 nubs/1,000 yards, and the yarn cannot be drawn.

The test is then repeated, (test B) except that the polymer is extruded from a slotted die 2×⅛ inches, directly in molten condition into a water bath at 25° C. The speed of puller rolls removing the ribbon from the bath is adjusted so that the ribbon is less than 0.050 inch thick. The polymer has a relative viscosity of 45. Examination under a polarizing microscope shows no spherulites, even at a magnification of 500X. After solid phase polymerization to a relative viscosity of 300, no spherulites are visible. The flake is spun at 330° C. to produce yarn with less than 5 nubs/1,000 yards. The spun yarn is drawn in two stages to a machine draw ratio of 5X. In the first stage, a snubbing pin at 150° C. is used. In the second stage, the yarn passes in several helical wraps around a pipe heated to 205° C. at the feed end, 230° C. in the middle and 245° C. at the delivery end. High tenacity yarn is produced with less than one break per pound.

EXAMPLE II

This example shows that spherulites in the flake cause no difficulty unless the polymer is solid-phase polymerized.

Polymer is prepared as in example I in an autoclave.

The polymer is extruded as in test A of example I. The polymer has a relative viscosity of 45, and a molecular weight of 14,000. Microscopic examination of the flake shows the presence of many spherulites.

This polymer is dried and melt-spun to filaments at a temperature of 330° C. Although there are some nubs in the filaments, they do not interfere with the drawing process. The spun yarn is drawn to a total machine draw ratio of 5.7X, using the same equipment and drawing conditions as in example I.

The drawing operation had good continuity, with less than two yarn breaks per pound.

What is claimed is:

1. A process for preparing high tenacity filaments of polymer derived from dodecanedioic acid and bis(4-aminocyclohexyl)methane of at least 80 percent trans-trans stereoisomer content, comprising reacting substantially equivalent amounts of the diacid and diamine in the melt to form polymer having a molecular weight of between about 12,000 and 15,000, quenching the molten polymer to a temperature below 160° C. by extruding a molten ribbon thereof having at least one dimension of under 0.050 inch into an aqueous bath for at least one second, cutting the ribbon into flake, further polymerizing the polymer in the solid state under vacuum or inert gas and while in flake form, to raise the molecular weight to above 25,000, melting the polymer flakes, extruding the molten polymer into filaments and drawing the filaments at least 2.5X.

* * * * *